United States Patent
Wang et al.

(10) Patent No.: US 7,034,738 B1
(45) Date of Patent: Apr. 25, 2006

(54) METHOD OF RADAR PATTERN RECOGNITION BY SORTING SIGNALS INTO DATA CLUSTERS

(75) Inventors: Paul C. Wang, Ridgewood, NJ (US); Charles R. Ward, Wellsboro, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 223 days.

(21) Appl. No.: 10/728,468

(22) Filed: Dec. 5, 2003

(51) Int. Cl.
*G01S 7/292* (2006.01)
*G01S 7/40* (2006.01)

(52) U.S. Cl. .......................... 342/13; 342/90; 342/195

(58) Field of Classification Search .................. 342/13, 342/90, 192, 194–196
See application file for complete search history.

(56) References Cited

U.S. PATENT DOCUMENTS

| | | | |
|---|---|---|---|
| 4,679,050 A * | 7/1987 | Bergman | 342/196 |
| 4,918,455 A * | 4/1990 | Maier | 342/13 |
| 5,381,150 A * | 1/1995 | Hawkins et al. | 342/13 |
| 5,583,505 A * | 12/1996 | Andersen et al. | 342/13 |
| 6,337,654 B1 * | 1/2002 | Richardson et al. | 342/90 |
| 6,437,728 B1 * | 8/2002 | Richardson et al. | 342/90 |
| 6,940,450 B1 * | 9/2005 | Blunt et al. | 342/195 |

OTHER PUBLICATIONS

"The minimum description length criterion applied to emitter number detection and pulse classification", Liu, J.; et al, Statistical Signal and Array Processing, 1998. Proceedingss., Ninth IEEE SP Workshop on Sep. 14-16, 1998 p:172-175.*

"Fractal feature extraction of radar emitter signals", Gexiang Zhang; Weidong Jin; Laizhao Hu Environmental Electromagnetics, 2003. CEEM 2003. Proceedings. Asia-Pacific Conference on Nov. 4-7, 2003 Page(s): 161-164.*

"Complexity feature extraction of radar emitter signals", Gexiang Zhang; Laizhao Hu; Weidong Jin Environmental Electromagnetics, 2003. CEEM 2003. Proceedings. Asia-Pacific Conference on Nov. 4-7, 2003 Page(s): 495-498.*

"Online Clustering Algorithms for Radar Emitter Classification", Jun Liu; Lee, J.P.Y.; Lingjie Li; Zhi-Quan Luo; Wong, K.M. Pattern Analysis and Machine Intelligence, IEEE Transactions on vol. 27, Issue 8, Aug. 2005 Ps: 1185-1196.*

Iterative Self Organizing Data Analysis Techniques (ISODATA), by J. T. Tou and R. C. Gonzalez, Pattern Recognition Principles, Addison-Wesley, 1974, Chapter 3, pp. 75-109.

* cited by examiner

Primary Examiner—John B. Sotomayor
(74) Attorney, Agent, or Firm—RatnerPrestia (57) ABSTRACT

A system and method for classifying radar emitters includes: (a) receiving a plurality of signals from the radar emitters; (b) generating data components for each signal received from the radar emitters; (c) forming multi-dimensional samples using the generated data components; and (d) sorting the multi-dimensional samples into a plurality of data clusters, based on their respective proximity to the data clusters, each data cluster representing a classification of a radar emitter.

21 Claims, 6 Drawing Sheets

METHOD OF RADAR PATTERN RECOGNITION BY SORTING SIGNALS INTO DATA CLUSTERS

TECHNICAL FIELD

The present invention relates, in general, to radar identification and, more specifically, to sorting signals received from multiple emitters into data clusters for pattern recognition.

BACKGROUND OF THE INVENTION

Radars emit a variety of signals that may characterize and identify them. Each radar may emit a specific pulse amplitude and a specific fixed radio frequency (RF) or a variable RF ranging over a fixed bandwidth. Each may emit a fixed pulse repetition frequency (PRF) or pulse repetition interval (PRI) and may be of a certain pulse width (PW).

An aircraft flying into a region with an onboard wideband receiver may detect a variety of signals emitted from multiple radars located in that region. Unless these signals are sorted and separated from each other, it is not possible for the aircraft to determine the types of classes of radars it is about to encounter. It does not know whether the radars are hostile and does not know whether the radars present a high or low threat to the incoming aircraft.

A need, therefore, exists for an aircraft to be able to sort and identify the variety of radars that are emitting energy towards the aircraft. The present invention addresses this need.

SUMMARY OF THE INVENTION

To meet this and other needs, and in view of its purposes, the present invention provides a method of classifying radar emitters including the steps of: (a) receiving a plurality of signals from the radar emitters; (b) generating data components for each signal received from the radar emitters; (c) forming multi-dimensional samples using the generated data components; and (d) sorting the multi-dimensional samples into a plurality of data clusters, based on their respective proximity to the data clusters, each data cluster representing a classification of a radar emitter. Step (b) includes generating pulse data descriptors (PDWs) during a predetermined interval of time, and generating at least radio frequency (RF) data and pulse width (PW) data for the PDWs.

In another embodiment, the invention provides a system for classifying radar emitters including a receiver for receiving a plurality of signals from the radar emitters, and a processor coupled to the receiver, for (a) generating data components for each signal received from the radar emitters, (b) forming multi-dimensional samples from the generated data components; and (c) sorting the multi-dimensional samples into a plurality of data clusters, based on their respective proximity to the data clusters, each data cluster representing a classification of a radar emitter.

The processor may also assign a multi-dimensional sample to a data cluster, based on a Euclidean distance between the multi-dimensional sample and a center of the data cluster. The center of the data cluster may be formed as a mean vector of a set of multi-dimensional samples assigned to the data cluster.

In yet another embodiment, the invention provides a machine readable storage medium containing a set of instructions for a computer. The set of instructions implements the following steps: (a) processing a plurality of signals received from a receiver; (b) generating data components for each signal received from the receiver; (c) forming multi-dimensional samples using the generated data components; and (d) sorting the multi-dimensional samples into a plurality of data clusters, based on their respective proximity to the data clusters, each data cluster representing a classification of a radar emitter. Step (d) may include sorting the multi-dimensional samples using an ISODATA (iterative self-organizing data analysis technique) computer algorithm.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention provides an unsupervised iterative classification method for radar pattern recognition. The method is self-organizing and requires minimal input from human interaction.

The method of the invention forms clusters from a set of input data (samples), where each cluster consists of very similar data (samples). The method first defines a measure of pattern similarity and establishes a rule for assigning individual samples to the domain of a specific cluster center. The invention uses the Euclidean distance between two data points x and z, $$D=\|x-z\|$$

as a measure of pattern similarity. The smaller the distance, D, the greater is the similarity between x and z.

After a measure of pattern similarity is selected, the method of the invention sorts (or partitions) samples into cluster domains. The Euclidean distance measure, D, lends itself to this procedure, because it is a good measure of proximity. However, because the proximity of two patterns is a relative measure of similarity, it is necessary for the invention to establish a threshold to define degrees of acceptable similarity for the clustering method.

A performance-index is chosen to measure the degrees of similarity and a procedure is used which minimizes the chosen performance index. One such performance index is the sum of the squared errors resulting from the cluster, and is a proximity measure given by $$J = \sum_{j=1}^{Nc} \sum_{x \in Sj} \|x - m_j\|^2$$

where Nc is the number of cluster domains (or simply clusters), Sj is the set of samples belonging to the jth domain, and $$m_j = (1/Nj) \sum_{x \in Sj} x$$

is the sample mean vector of set Sj, with Nj representing the sample size of Sj.

There are other performance indices used in the method of clustering the samples, such as: (1) average squared distances between samples in a cluster domain, (2) average squared distances between samples in different cluster domains, (3) indices based on a scatter matrix and (4) minimum and maximum variance indices.

Figure 1:
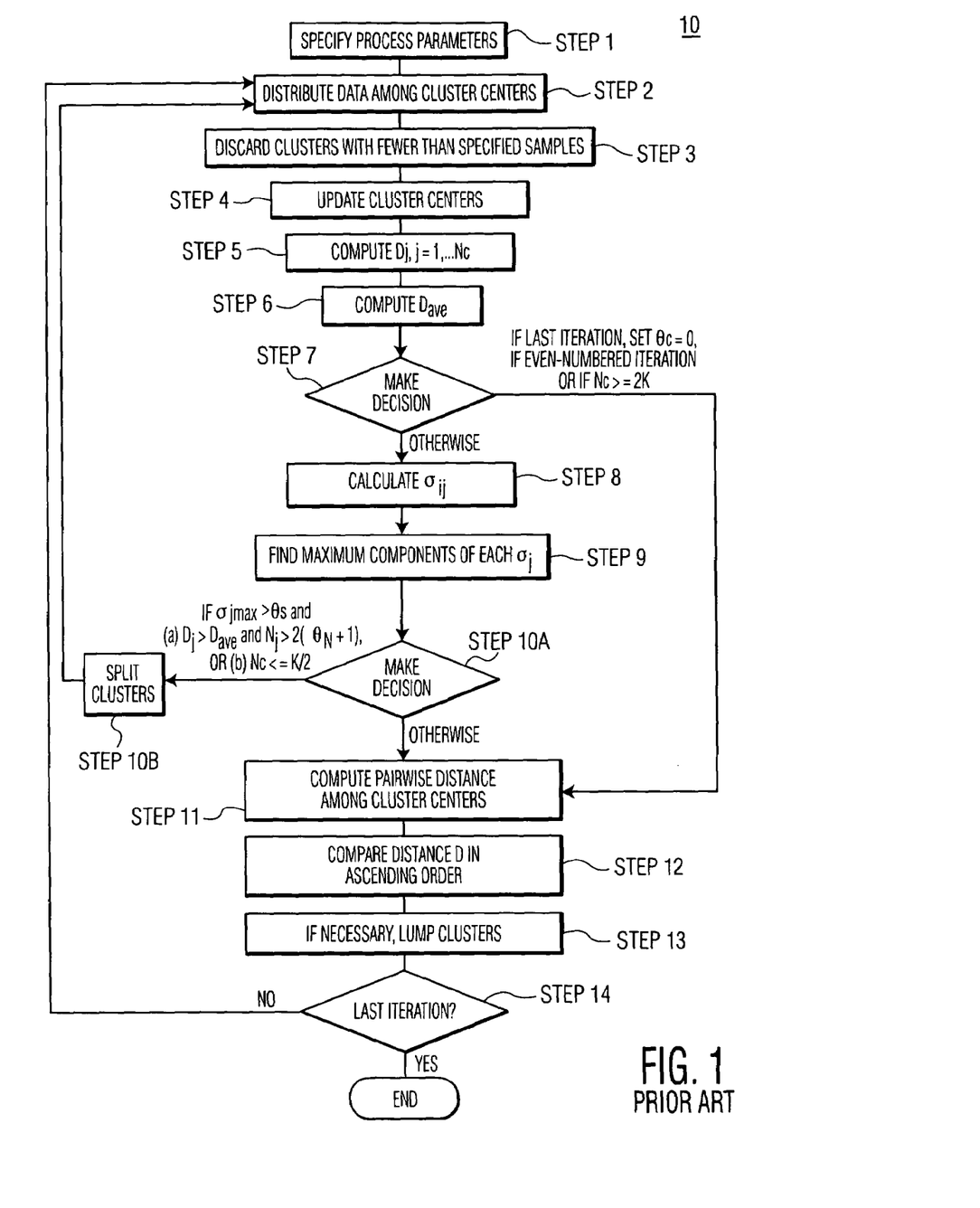
FIG. 1 is a flow diagram showing steps performed by a conventional ISODATA computer algorithm.

An embodiment of the invention will now be described based on an algorithm referred to as Iterative Self Organizing Data Analysis Techniques (ISODATA), which is disclosed by J. T. Tou and R. C. Gonzalez, Pattern Recognition Principles, Addison-Wesley, 1974, Chapter 3, pp. 75–109. The ISODATA algorithm, generally designated as 10, is also shown in FIG. 1, and is further described below.

For a set of N samples, $\{x_1, x_2, \ldots, x_N\}$, ISODATA clustering algorithm includes the following steps:

Step 1: Specify various clustering parameters, as follows:
K=number of cluster centers desired;
$\theta_N$=the minimum number of samples allowed in a cluster;
$\theta_S$=standard deviation parameter;
$\theta_C$=lumping parameter;
L=maximum number of pairs of cluster centers which may be lumped;
I=number of iterations allowed.

Step 2: Distribute the N samples among the present cluster centers, using the following relationship:

$$x \in Sj \text{ if } \|x-zj\| \leq \|x-zi\|, i=1,2,\ldots, Nc; i \neq j$$

for all x in the sample set. In this notation, Sj represents the subset of samples assigned to the cluster center zj.

Step 3: Discard sample sets with fewer than ON members. That is, if for any j, $Nj < \theta_N$, discard Sj and reduce Nc by 1.

Step 4: Update each cluster center zj, j=1,2, . . . , Nc, by setting it equal to the sample mean of its members (Sj), as follows:

$$z_j = \frac{1}{N_j} \sum_{x \in Sj} x,$$

$$j = 1, 2, \ldots, Nc$$

where Nj is the number of samples in Sj.

Step 5: Compute the average distance Dj of samples in cluster domain Sj from their corresponding cluster center, using the following relationship:

$$D_j = \frac{1}{N_j} \sum_{x \in} \|x - zj\|,$$

$$j = 1, 2, \ldots Nc$$

Step 6: Compute the overall average distance of the samples from their respective cluster centers, using the following relationship:

$$D_{ave} = \frac{1}{N_c} \sum_{j=1}^{Nc} N_j D_j.$$

Step 7: The following decisions are then made:
(a) If this is the last iteration, set $\theta_c=0$ and go to Step 11;
(b) If $Nc \leq K/2$, then go to Step 8;
(c) If this is an even-numbered iteration, or if $Nc \geq 2K$, go to Step 11; otherwise continue.

Step 8: Find the standard deviation vector $\sigma_j=(\sigma_{1j}, \sigma_{2j}, \ldots, \sigma_{nj})'$ for each sample subset, using the following relationship:

$$\sigma_{ij} = \sqrt{\frac{1}{N_j} \sum_{x \in Sj} (x_{ik} - z_{ij})^2},$$

$$i = 1, 2, \ldots n;$$

$$j = 1, 2, \ldots, Nc$$

where n is the sample dimensionality, $x_{ik}$ is the ith component of the kth sample in Sj; $z_{ij}$ is the ith component of $z_j$, and Nj is the number of sample in Sj. Each component of $\sigma_j$ represents the standard deviation of the samples in Sj along a principal coordinate axis.

Step 9: Find the maximum component of each $\sigma_j$, j=1,2, . . . , Nc and denote it by $\sigma_{jmax}$.

Step 10: If for any $\sigma_{jmax}$, j=1,2, . . . , Nc, there are $\sigma_{jmax} > \theta_S$, and
(a) $Dj > D_{ave}$ and $Nj > 2(\theta_N+1)$,
or
(b) $Nc \leq K/2$ then split zj into two new cluster centers $zj^+$ and $zj^-$, delete zj, and increase Nc by 1.

Cluster center zj$^+$ is formed by adding a given quantity $\gamma_j$ to the component zj which corresponds to the maximum component of $\sigma_j$, ($\sigma_{jmax}$). Similarly, zj$^-$ is formed by subtracting $y_j$ from the same component of zj. One way of specifying $y_j$ is to let it be equal to a fraction of $\sigma_{jmax}$, that is $\gamma_j = k\sigma_{jmax}$ with 0<k<1.

If splitting took place in this step, then go to Step 2; otherwise continue.

Step 11: Compute the pairwise distances Dij between all cluster centers, as follows:

$$D_{ij}=\|z_i-z_j\|, i=1,2, \ldots, Nc-1; j=i+1, \ldots, Nc$$

Step 12: Compare the distances Dij against the parameter $\theta_C$. Arrange the L smallest distances which are less than $\theta_C$ in ascending order, as follows:

$$[Di_1j_1, Di_2j_2, \ldots, Di_Lj_L]$$

where $Di_1j_1 < Di_2j_2 < \ldots < Dij_L$ and L is the maximum number of pairs of cluster centers which may be lumped together. The lumping process is described below in Step 13.

Step 13: With each distance $Di_kj_k$, there is associated a pair of cluster centers $Z_k$ and $Z_k$. Starting with the smallest of these distances, perform a pairwise lumping operation, according to the following relationship:

For k=1, 2, ..., L, if neither $Zi_k$ nor $Zj_k$ has been used in lumping during this iteration, merge these two cluster centers, using the following relationship:

$$z_k^* = \frac{1}{N_{ik} + N_{jk}}[N_{ik}(z_{ik}) + N_{jk}(z_{jk})]$$

Delete $Zi_k$ and $Zj_k$ and reduce Nc by 1.

It is noted that only pairwise lumping is allowed and that a lumped cluster center may be obtained by weighting each old cluster by the number of samples in its domain. It will be understood that since a cluster center can only be lumped once, this step may not always result in L lumped centers.

Step 14: If this is the last iteration, the algorithm terminates. Otherwise, go to Step 1 if any of the process parameters requires changing at the user's discretion, or go to Step 2 if the parameters are to remain the same for the next iteration. An iteration is counted every time the procedure returns to Step 1 or 2.

Based on a flowchart of the ISODATA algorithm, illustrated in FIG. 1, the inventors developed a computer program, as described below, for radar threat clustering and radar identification/recognition based on the clustering. The program was written in MATLAB, although other languages may have been used.

A listing of the MATLAB program for clustering radar data samples is provided in the following tables.

Figure 2:
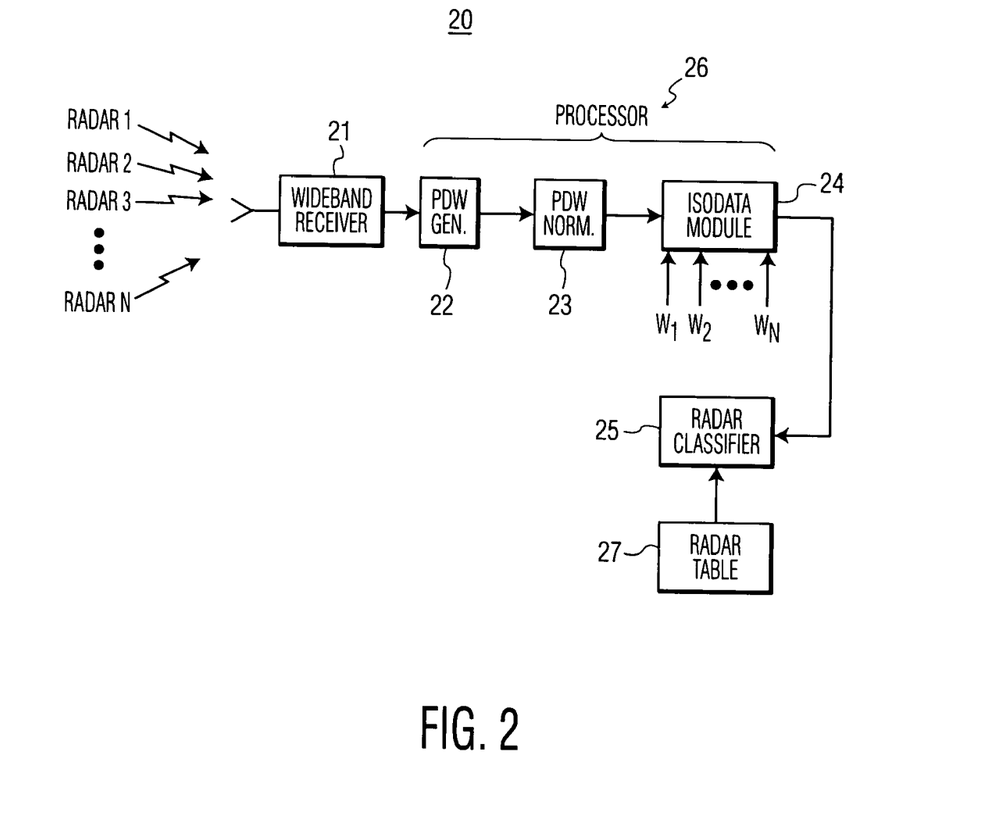
FIG. 2 is a system block diagram illustrating a radar threat sorting, clustering and classification system, in accordance with an embodiment of the present invention.

Table A, threat_gen_n.m, lists a program for generating a snapshot of the radars' pulse descriptive words (PDWs). The snapshot includes PDW mixes from multiple radar threats, as they may be intercepted by wideband receiver 21, as shown in FIG. 2. Exemplary snapshots (80 ms duration) are shown in FIGS. 3–6 (discussed later).

TABLE A

Program threat gen n.m

```
clear all;
colors=['r','b','k','g','m','y','p'];
% ---------------------------------------------------------------
%
```

TABLE A-continued

Program threat gen n.m

```
% --- Program threat_gen_n.m
%
% This program is used to generate threat signal PDW for isodata.m
%
% ---------------------------------------------------------------
%
ss='';
%
% argument for threatlist of each row:
%
% freq,std_freq,aoa,std_aoa,pw,std_pw,pa,std_pa,toa,std_toa,pri,id
%
%
threatlist=[900,200,35,10,8,2,-5,10,22,0,1120,1;...
            1050,100,40,10,14,2,-15,10,300,0,1820,2;...
            1150,150,45,10,4,2,-20,10,1700,0,1920,3;...
            1310,190,50,10,6.5,2,-35,10,700,0,1320,4;...
            1210,5,53,4,12,2,-45,10,1900,0,2920,5];
%
%the weight set: w1=0.; w2=0.1; w3=0.1; w4=0.1; w5=0.1; w6=0.;
%
%
    [row,col]=size(threatlist);
    for threatnum=1:row
    a=threat(threatlist(threatnum,:));
        tmptxt=sprintf('threat_%d=a;',threatnum); %dynamically
name and create variable
        eval(tmptxt);
        ss=cat(1,ss,a);
    end
ss_sorted=sortrows(ss,1);
sss=zeros(size(ss));
sss=ss_sorted;
[row,col]=size(sss);
%
% ---------------------------------------------------------------
%
% ploting input PDWs
%
% ss_sorted(:,1) - TOA
% ss_sorted(:,2) - AOA
% ss_sorted(:,3) - RF Freq
% ss_sorted(:,4) - Pulsewidth
% ss_sorted(:,5) - Pulse Amp
% ss_sorted(:,6) - Threat ID
% ---------------------------------------------------------------
%
figure
scatter(ss_sorted(:,4),ss_sorted(:,3),5,ss_sorted(:,6),'filled')
title('Input Threat PDWs in 80 ms Snapshot','FontSize',12,'FontWeight',
'bold')
xlabel('Pulsewidth (usec)');
ylabel('RF Frequency (MHz)');
%
figure
scatter(ss_sorted(:,1),ss_sorted(:,2),5,ss_sorted(:,6),'filled')
title('Input Threat PDWs in 80 ms Snapshot','Fontsize',12,'FontWeight',
'bold')
xlabel('Time of Arrival (usec)');
ylabel('Angle of Arrival (deg)');
%
figure
scatter(ss_sorted(:,1),ss_sorted(:,3),5,ss_sorted(:,6),'filled')
title('Input Threat PDWs in 80 ms Snapshot','FontSize',12,'FontWeight',
'bold')
xlabel('Time of Arrival (usec)');
ylabel('RF Frequency (deg)');
%
figure
scatter(ss_sorted(:,1),ss_sorted(:,4),5,ss_sorted(:,6),'filled')
title('Input Threat PDWs in 80 ms Snapshot','FontSize',12,'FontWeight',
'bold')
xlabel('Time of Arrival (usec)');
ylabel('Pulsewidth (usec)');
%
figure
scatter(ss_sorted(:,1),ss_sorted(:,5),5,ss_sorted(:,6),'filled')
```

TABLE A-continued

Program threat gen n.m

```
title('Input Threat PDWs in 80 ms Snapshot','FontSize',12,'FontWeight',
    'bold')
xlabel('Time of Arrival (usec)');
ylabel('Pulse Amplitude (dBm)');
%
for colindex=2:(col-1)
    sigma=std(sss(:,colindex));
    mean1=mean(sss(:,colindex));
    sss(:,colindex)=(sss(:,colindex)-mean1)./sigma*5;
end
%
mean_value=[mean(ss(:,2)),mean(ss(:,3)),mean(ss(:,4)),mean(ss(:,5))];
std_value=[std(ss(:,2)),std(ss(:,3)),std(ss(:,4)),std(ss(:,5))];
n_total=length(sss);
%
disp('***** Input PDWs *****')
disp(ss_sorted)
disp('***** Normalized PDWs *****')
disp(sss)
disp('***** Mean Value Vector *****')
disp(mean_value)
disp('***** STD Vector *****')
disp(std_value)
disp('***** Sample Size *****')
disp(n_total)
%
% store generated PDW's
%
dlmwrite('test_pdw_n.out',sss)
dlmwrite('mean_value_n.out',mean_value)
dlmwrite('std_value_n.out',std_value)
dlmwrite('n_total_n.out',n_total)
%
%
% --- end of program
```

Each PDW, which is a vector, is composed of four components, describing an intercepted radar pulse, as follows: (1) time of intercept (or arrival), TOA, (2) radio frequency, RF, (3) pulse width, PW, and (4) pulse amplitude, PA. It will be appreciated that in other embodiments of the present invention, less or more than four components (dimensions) of each PDW may be selected. For example, other components may be pulse repetition interval (PRI), modulation type, etc.

Referring to FIG. 2, system 20 includes wideband receiver 21 for receiving desired components of each radar 1-N. Also included is processor 26, coupled to wideband receiver 21, for generating each PDW using PDW generator 22, normalizing each PDW using PDW normalizer 23 and clustering each normalized PDW into a respective cluster using ISODATA module 24. The ISODATA module executes the steps of the ISODATA algorithm. After a predetermined number of iterations of the ISODATA algorithm, the clusters of PDWs may be formed and provided to radar classifier module 25, which may be included in processor 26 or may be a separate module. By matching the clusters against stored table 27, the latter containing identifications of known radars (threats and/or non-threats), the radars may be classified and identified.

Each raw PDW is normalized by module 23 of system 20, using the following relationship:

$$PDW_{Nor} = [PDW_{Raw} - PDW_{Ave}]/STD_{PDW}$$

where $PDW_{Nor}$ is the individual normalized PDW vector, $PDW_{raw}$ is the individual PDW as intercepted by wideband receiver 21, $PDW_{Ave}$ is the average PDW vector of the entire snapshot, and $STD_{PDW}$ is the standard deviation vector calculated from $PDW_{Raw}$ and $PDW_{Ave}$.

Table B, threat.m, lists a MATLAB function called by threat_gen_n.m to generate the PDWs.

TABLE B

Program threat.m

```
function a=threat(inputvector)
% ----------------------------------------------------------------
%
% --- Program threat.m
%
% This program is used to generate PDW for threat
%
% ----------------------------------------------------------------
%
% Snapshot Size
%
nt=80000;
%
% parameters of each threat
%
freq=inputvector(1);
std_freq=inputvector(2);
aoa=inputvector(3);
std_aoa=inputvector(4);
pw=inputvector(5);
std_pw=inputvector(6);
pa=inputvector(7);
std_pa=inputvector(8);
toa=inputvector(9);
std_toa=inputvector(10);
pri=inputvector(11);
ww=inputvector(12);
%
% generate threat PDW's with n types each with k samples
%
np2=floor((nt-toa(1))/pri);
%disp(np2)
%
a1=toa(1);
for irun=1:np2
    a1=a1+pri;
    a2=aoa(1)+(rand(1)-0.5)*std_aoa(1);
    a3=freq(1)+(rand(1)-0.5)*std_freq(1);
    a4=pw(1)+(rand(1)-0.5)*std_pw(1);
    a5=pa(1)+(rand(1)-0.5)*std_pa(1);
    a6=ww(1);
    a(irun,:)=[a1 a2 a3 a4 a5 a6];
end
```

Table 1, isodata_n.m, is the main program, which executes Step 1, Step 7 and Step 14 of the ISODATA algorithm, executed by module 24 of FIG. 2. In the exemplary embodiment of the invention, the performance index for measuring similarity between two PDWs uses only two components, namely RF and PW.

The Euclidean distance, Dij, between PDWs (PDWi and PDWj) is calculated as follows:

$$D_{ij} = w_1(RF_i - RF_j)^2 + w_2(PW_i - PW_j)^2$$

where $(RF_i, PW_i)$ and $(RF_j, PW_j)$ represent $PDW_i$ and $PDW_j$, respectively. Two weights, $w_1$ and $w_2$ are used, as an example, to adjust the relative size of the cluster (or equivalently, the pairwise distance between cluster centers) to be generated in ISODATA. The relative size may be adjusted as a function of the overall frequency and pulse width deviations, which likely are related to the number of input radar threats of the input snapshot, or may be adjusted as a function of dedicated frequency bands in which advanced emitters may reside and need to be clustered into a specific cluster size.

Referring to Table 1, six weights are listed ($w_1$–$w_6$). All weights are set to zero, except $w_3$ and $w_4$, which are RF frequency and pulse width, respectively. It will also be appreciated that initially at the start of the ISODATA algorithm, the number of clusters may be assumed to be 1. Samples to far away from a center of this original cluster may then be dropped from the cluster and a new cluster may be formed from the dropped samples.

TABLE 1

Program ISODATA n.m

```
%       Program isodata_n.m
%
% Interactive Self-Organizing Data Analysis Technique Algorithm
%           (ISODATA)
%
% input Data to be clustered
%
%
ss=dlmread('test_pdw_n.out');       % input pdws
fmean=dlmread('mean_value_n.out');  % mean value vector
fstd=dlmread('std_value_n.out');    % std value vector
n_total=dlmread('n_total_n.out');   % total number of input pdws
%
%
np=n_total;
ndim=6;
%
% parameters and initial conditions
%
w1=0.;          %TOA
w2=0.0;         %AOA
w3=0.1;         %RF Freq
w4=0.15;        %Pulsewidth
w5=0.;          %Pulse Amp
w6=0.;          %ID
%
% initial number of cluster = 1
%
nc=1;
%
z(1,:)=ss(1,:);
%
% -----------------------------------------------------------
% ***** Step 1 (specify parameters) *******
% -----------------------------------------------------------
%
k=18;           % number of cluster centers desired
theta_n=1;      % min numbers allowed in a cluster
%
% -----------------------------------------------------------
%
% original settings:
%
%theta_s=0.75;  % std parameter
%theta_c=2;     % lumping parameter
%
%
theta_s=0.75;   % std parameter
theta_c=1;      % lumping parameter
%
% -----------------------------------------------------------
%
L=0;            % max number of pairs of cluster centers allowed to be
                  lumped
Imax=12;        % number of iterations allowed
%
%
disp('***** SODATA Cluster Seeking Algorithm ******')
%
disp('***** Number of Data Points ******')
disp(np)
%
disp('***** Dimension of PDW ******')
disp(ndim)
%
disp('***** Input Normalized PDWs Data *****')
disp(ss)
disp('***** Input Mean Value Vector *****')
disp(fmean)
disp('***** Input STD Vector *****')
```

TABLE 1-continued

Program ISODATA n.m

```
disp(fstd)
%
disp('***** Number of Clusters Desired ******')
disp(k)
%
disp('***** Min Number of Data Required in a Cluster ******')
disp(theta_n)
%
disp('***** STD Parameter ******')
disp(theta_s)
%
disp('***** Lumping Parameter ******')
disp(theta_c)
%
disp('***** Max Number of Cluster-Pairs Allowed to be Lumped
******')
disp(L)
%
disp('***** Max Number of Iterations Allowed ******')
disp(Imax)
disp(' ')
disp('***** Start Isodata Algorithm ******')
disp('**************************************')
%
%
for irun = 1:Imax              % number of total "do loops" to step 14
    %
    % set initial condition for each loop ------------------------
    %
    goto2=0;
    goto11=0;
    split=0;
    %
    % -----------------------------------------------------------
    %
    step2
    step3
    step4
    step5
    step6
    %
    % ---------------------------------
    % ***** step 7 *************
    % ---------------------------------
    %
    if (irun == Imax)
        theta_c=0;
        goto11=1;
    end
    %
    if (irun ~= Imax & (mod(irun,2) == 0 | nc >= 2*k))
        goto11=1;
    end
    %
    if (irun ~= Imax & nc > k/2)
        goto11 ~= 1;
    end
    %
    if goto11 ~= 1;
        step8
        step9
        step10
        nc=ncc;
        if split == 1
            goto2 = 1;
        end
    end
    %
    if goto2 ~= 1
        step11
        step12
    end
end                            %main loop
%
% Summary of Clusters' Positions
%
disp(' ')
```

TABLE 1-continued

Program ISODATA n.m

```
disp('***** Summary of Clustering Results')
disp('*************************************')
disp(' ')
disp('***** Clusters Positions *****')
sc=5;
for ipr=1:nc
    z(ipr,2)=z(ipr,2)*fstd(1)/sc+fmean(1);
    z(ipr,3)=z(ipr,3)*fstd(2)/sc+fmean(2);
    z(ipr,4)=z(ipr,4)*fstd(3)/sc+fmean(3);
    z(ipr,5)=z(ipr,5)*fstd(4)/sc+fmean(4);
end
disp(z)
disp('***** Clusters Members *****')
for ipr=1:np
    yy(ipr,2)=yy(ipr,2)*fstd(1)/sc+fmean(1);
    yy(ipr,3)=yy(ipr,3)*fstd(2)/sc+fmean(2);
    yy(ipr,4)=yy(ipr,4)*fstd(3)/sc+fmean(3);
    yy(ipr,5)=yy(ipr,5)*fstd(4)/sc+fmean(4);
end
disp(yy)
```

TABLE 2

Program STEP2.m

```
% ***** Step 2 (cluster data based on Euclidean distances) ******
% ---------------------------------------------------------------
%
disp('***** Step 2 ****')
disp('*** Run Number ***')
disp(irun)
    %
    % If there are more than 1 clusters
    %
disp('*** Number of Clusters ****')
disp(nc)
    if nc > 1          % for multiple clusters,
% the else at line 94
        %
        % Euclidean Distance
        %
        for idis=1:nc
            for kdis=1:np
                dis2=w1*(ss(kdis,1)-z(idis,1))^2 + w2*(ss(kdis,2)-z(idis,
                    2))^2 + ...
                    w3*(ss(kdis,3)-z(idis,3))^2 + w4*(ss(kdis,4)-z(idis,4))^2 +
                    ...
                    w5*(ss(kdis,5)-z(idis,5))^2 + w6*(ss(kdis,6)-z(idis,6))^2;
                dis(kdis,idis)=sqrt(dis2);
            end          % for kdis at line 17
        end              % for idis at line 16
        %
        % Sorting into clisest cluster center
        %
        for kdis=1:np
            comp=dis(kdis,1);
            i_sort(kdis)=1;
            for idis=1:nc
                if dis(kdis,idis) < comp
                    comp = dis(kdis,idis);
                    i_sort(kdis)=idis;
                end      % for if at line 31
            end          % for idis at line 30
        end              % for kdis at line 27
        %
        % Count how many members in each cluster
        %
        for idis=1:nc
            n_total(idis)=0;
            for kdis=1:np
                if i_sort(kdis) == idis
                    n_total(idis)=n_total(idis)+1;
                end      % for if at line 43
            end          % for kdis at line 42
```

TABLE 2-continued

Program STEP2.m

```
        end              % for idis at line 40
    %
    % If there is only one cluster
    %
    else                 % for if at line 12, only one cluster
        for kdis=1:np
            i_sort(kdis)=1;
        end              % for kids at line 52
        n_total(1)=np;
    end                  % for else at line 51
%
% print present cluster centers
%
disp('******** Present Cluster Centers ******')
%
for iprint=1:nc
    z(iprint,:);
end                      % for iprint at line 62
disp(z)
%
for iprint=1:np
    yy(iprint,:)=[ss(iprint,:) i_sort(iprint)];
end
disp('****** Present Cluster Members *******')
disp('        Input Data                        Cluster')
disp(yy)
sc=5;
for ipr=1:np
yz(ipr,1)=yy(ipr,1);
yz(ipr,2)=yy(ipr,2)*fstd(1)/sc+fmean(1);
yz(ipr,3)=yy(ipr,3)*fstd(2)/sc+fmean(2);
yz(ipr,4)=yy(ipr,4)*fstd(3)/sc+fmean(3);
yz(ipr,5)=yy(ipr,5)*fstd(4)/sc+fmean(4);
yz(ipr,6)=yy(ipr,6);
yz(ipr,7)=yy(ipr,7);
end
%
% plot clustering results after each run
%
% --------------------------------------
%
% yz(:,1) - TOA
% yz(:,2) - AOA
% yz(:,3) - RE Freq
% yz(:,4) - Pulsewidth
% yz(:,5) - Pulse Amp
% yz(:,6) - Threat ID
% yz(:,7) - Cluster Number
%
% --------------------------------------
    %
    figure
    scatter(yz(:,4),yz(:,3),5,yz(:,7),'filled')
    title(sprintf('Clustered PDWs, Run Number=
        %d',irun),'FontSize',12,'FontWeight','bold');
    xlabel('Pulsewidth (usec)');
    ylabel('RF Frequency (MHz)');
    M(irun) = getframe;
```

Table 3, step3.m, lists the program to perform ISODATA Step 3.

TABLE 3

Program STEP3.m

```
% ***** Step 3 (discard subsets with fewer than theta_n members)
******
% ----------------------------------------------------------------
disp('***** Step 3 ****')
    n_new=0;
    for idis=1:nc
        if n_total(idis) >= theta_n
            n_new=n_new+1;
            n_total(n_new)=n_total(idis);
```

TABLE 3-continued

Program STEP3.m

```
        end                    % for if at line 7
    end                        % for idis at line 6
    nc=n_new;
```

Table 4, step4.m, lists the program to perform ISODATA Step 4.

TABLE 4

Program STEP4.m

```
% ***** Step 4 (update cluster centers as their samples' means) ******
% ----------------------------------------------------------
disp('***** Step 4 ****')
for idis=1:nc
    if n_total(idis) ~= 0
        z(idis,:)=0;
        for kdis=1:np
            if i_sort(kdis) == idis
                z(idis,:)=z(idis,:)+ss(kdis,:);
            end                % for if at line 9
        end                    % for kdis at line 8
        z(idis,:)=z(idis,:)/n_total(idis);
    end                        % for if at line 6
end                            % for idis at line 5
%
% print new cluster centers
%
disp('***** New Cluster Points ******')
%
%for iprint=1:nc
% iprint, z(iprint,:)
%end                           % for iprint at line 21
disp (z)
%
```

Table 5, step5.m, lists the program to perform ISODATA Step 5.

TABLE 5

Program STEP5.m

```
% ***** Step 5 (compute average distance to cluster center within each
% cluster) ******
% ----------------------------------------------------------
%
disp('***** Step 5 ****')
for idis=1:nc
    if n_total(idis) > 0
        dis_c(idis)=0;
        for kdis=1:np
            if i_sort(kdis) == idis
                dis2=w1*(ss(kdis,1)-z(idis,1))^2 + w2*(ss(kdis,2)-z(idis,2))^2 + ...
                    w3*(ss(kdis,3)-z(idis,3))^2 + w4*(ss(kdis,4)-z(idis,4))^2 + ...
                    w5*(ss(kdis,5)-z(idis,5))^2 + w6*(ss(kdis,6)-z(idis,6))^2;
                dis_c(idis)=dis_c(idis)+sqrt(dis2);
            end                % for if at line 10
        end                    % for kdis at line 9
        dis_c(idis)=dis_c(idis)/n_total(idis);
    end                        % for if at line 7
end                            % for idis at line 6
%
% print average distance within each cluster
%
disp('******* Ave Distance within each Cluster ******')
%
%for ipr=1:nc
% ipr, dis_c(ipr)
%end
disp(dis_c)
%
```

Table 6, step6.m, lists the program to perform ISODATA Step 6.

TABLE 6

Program STEP6.m

```
% ----------------------------------------------------------
% ***** Step 6 (compute overall average distance) ******
% ----------------------------------------------------------
%
disp('***** Step 6 ****')
dis_t=0;
for idis=1:nc
    if n_total(idis) > 0
        dis_t=dis_t + n_total(idis)*dis_c(idis);
    end                        % for if at line 8
end                            % for idis at line 7
%
% print overall average distance
%
disp('******* Overall Ave Distance from Clusters ******')
%
dis_ave=dis_t/np;
disp(dis_ave)
%
```

(Table 7 is skipped for convenience of numbering the tables so that they correspond to the numbered IDODATA steps.)

Table 8, step8.m, lists the program to perform ISODATA Step 8.

TABLE 8

Program STEP8.m

```
%
% ----------------------------------------------------------
% ***** Step 8 (find STD vector for each sample set) ******
% ----------------------------------------------------------
%
disp('***** At Step 7, It decides to go to Step 8 *****')
%
for idis=1:nc
    var1=0;
    var2=0;
    var3=0;
    var4=0;
    var5=0;
    var6=0;
    for kdis=1:np
        if i_sort(kdis) == idis
            var1=var1+w1*(ss(kdis,1)-z(idis,1))^2;
            var2=var2+w2*(ss(kdis,2)-z(idis,2))^2;
            var3=var3+w3*(ss(kdis,3)-z(idis,3))^2;
            var4=var4+w4*(ss(kdis,4)-z(idis,4))^2;
            var5=var5+w5*(ss(kdis,5)-z(idis,5))^2;
            var6=var6+w6*(ss(kdis,6)-z(idis,6))^2;
        end                    % for if at line 16
    end                        % for if at line 15
    std(idis,1)=sqrt(var1/n_total(idis));
    std(idis,2)=sqrt(var2/n_total(idis));
    std(idis,3)=sqrt(var3/n_total(idis));
    std(idis,4)=sqrt(var4/n_total(idis));
    std(idis,5)=sqrt(var5/n_total(idis));
    std(idis,6)=sqrt(var6/n_total(idis));
end                            % for idis at line 8
%
% print std vector for each cluster
%
' ****** STD Vector for each Cluster ******'
%
%for ipr=1:nc
% ipr,std(ipr,:)
%end                           % for ipr at line 37
disp(std)
%
```

Table 9, step9.m, lists the program to perform ISODATA Step 9.

TABLE 9

Program STEP9.m

```
% ------------------------------------------------------------
% ***** Step 9 (find the max component of each std vector and its
orientation) ******
% ------------------------------------------------------------
%
disp('***** Step 9 *****')
for idis=1:nc
    stdmax(idis)=std(idis,1);
    i_stdmax(idis)=1;
end                             % for idis at line 6
for idis=1:nc
    if std(idis,2) > stdmax(idis)
        stdmax(idis)=std(idis,2);
        i_stdmax(idis)=2;
    end
    if std(idis,3) > stdmax(idis)
        stdmax(idis)=std(idis,3);
        i_stdmax(idis)=3;
    end
    if std(idis,4) > stdmax(idis)
        stdmax(idis)=std(idis,4);
        i_stdmax(idis)=4;
    end
    if std(idis,5) > stdmax(idis)
        stdmax(idis)=std(idis,5);
        i_stdmax(idis)=5;
    end
    if std(idis,6) > stdmax(idis)
        stdmax(idis)=std(idis,6);
        i_stdmax(idis)=6;
    end
end                             % for idis at line 10
%
% print max std vector and direction of each cluster
%
disp('****** Max STD and Its Direction ******')
for ipr=1:nc
    max_std(ipr,:) = [ipr,stdmax(ipr),i_stdmax(ipr)];
end                             % for ipr at line 35
disp(max_std)
%
```

Table 10, step10.m, lists the program to perform ISODATA Step 10.

TABLE 10

Program STEP10.m

```
% ------------------------------------------------------------
% ***** Step 10 (determine whether to split into more clusters) ******
% ------------------------------------------------------------
%
disp('***** Step 10 *****')
%
disp('******* New Splitted Clusters ******')
ncc=nc;
for idis=1:nc
    if stdmax(idis) > theta_s
        if ((dis_c(idis) > dis_ave & n_total(idis) > 2*(theta_n+1)) |
(nc < k/2))
            gamma=0.5*stdmax(idis);
            split=1;
            if i_stdmax(idis) == 1
                z(idis,1)=z(idis,1)+gamma;
                z(ncc+1,1)=z(idis,1)-2*gamma;
                z(ncc+1,2)=z(idis,2);
                z(ncc+1,3)=z(idis,3);
                z(ncc+1,4)=z(idis,4);
                z(ncc+1,5)=z(idis,5);
                z(ncc+1,6)=z(idis,6);
                disp(z(idis,:))
```

TABLE 10-continued

Program STEP10.m

```
                disp(z(ncc+1,:))
                ncc=ncc+1;
            elseif i_stdmax(idis) == 2
                z(idis,2)=z(idis,2)+gamma;
                z(ncc+1,2)=z(idis,2)-2*gamma;
                z(ncc+1,1)=z(idis,1);
                z(ncc+1,3)=z(idis,3);
                z(ncc+1,4)=z(idis,4);
                z(ncc+1,5)=z(idis,5);
                z(ncc+1,6)=z(idis,6);
                disp(z(idis,:))
                disp(z(ncc+1,:))
                ncc=ncc+1;
            elseif i_stdmax(idis) == 3
                z(idis,3)=z(idis,3)+gamma;
                z(ncc+1,3)=z(idis,3)-2*gamma;
                z(ncc+1,1)=z(idis,1);
                z(ncc+1,2)=z(idis,2);
                z(ncc+1,4)=z(idis,4);
                z(ncc+1,5)=z(idis,5);
                z(ncc+1,6)=z(idis,6);
                disp(z(idis,:))
                disp(z(ncc+1,:))
                ncc=ncc+1;
            elseif i_stdmax(idis) == 4
                z(idis,4)=z(idis,4)+gamma;
                z(ncc+1,4)=z(idis,4)-2*gamma;
                z(ncc+1,1)=z(idis,1);
                z(ncc+1,2)=z(idis,2);
                z(ncc+1,3)=z(idis,3);
                z(ncc+1,5)=z(idis,5);
                z(ncc+1,6)=z(idis,6);
                disp(z(idis,:))
                disp(z(ncc+1,:))
                ncc=ncc+1;
            elseif i_stdmax(idis) == 5
                z(idis,5)=z(idis,5)+gamma;
                z(ncc+1,5)=z(idis,5)-2*gamma;
                z(ncc+1,1)=z(idis,1);
                z(ncc+1,2)=z(idis,2);
                z(ncc+1,3)=z(idis,3);
                z(ncc+1,4)=z(idis,4);
                z(ncc+1,6)=z(idis,6);
                disp(z(idis,:))
                disp(z(ncc+1,:))
                ncc=ncc+1;
            else
                z(idis,6)=z(idis,6)+gamma;
                z(ncc+1,6)=z(idis,6)-2*gamma;
                z(ncc+1,1)=z(idis,1);
                z(ncc+1,2)=z(idis,2);
                z(ncc+1,3)=z(idis,3);
                z(ncc+1,4)=z(idis,4);
                z(ncc+1,5)=z(idis,5);
                disp(z(idis,:))
                disp(z(ncc+1,:))
                ncc=ncc+1;
            end                     % for if at line 14
        end                         % for if at line 12
    end                             % for if at line 11
end                                 % for idis at line 10
```

Table 11, step11.m, lists the program to perform ISODATA Step 11.

TABLE 11

Program STEP11.m

```
% ------------------------------------------------------------
% ***** Step 11 (compute pairwise distance between cluster centers and
% ***** whether to lump) ******
% ------------------------------------------------------------
%
disp('***** Step 11 *****')
```

TABLE 11-continued

Program STEP11.m

```
for idis1=1:nc-1
    for idis2=2:nc
        if idis2 > idis1
            diss=w1*(z(idis1,1)-z(idis2,1))^2 + w2*(z(idis1,2)-z(idis2,2))^2 +
            ...
            w3*(z(idis1,3)-z(idis2,3))^2 + w4*(z(idis1,4)-z(idis2,4))^2 +
            ...
            w5*(z(idis1,5)-z(idis2,5))^2 + w6*(z(idis1,6)-z(idis2,6))^2;
            dis_bw(idis1,idis2)=sqrt(diss);
            lump(idis1,idis2)=0;
            if dis_bw(idis1,idis2) <= theta_c
                lump(idis1,idis2)=1;
            end                          % for if at line 15
        end                              % for if at line 9
    end                                  % for idis2 at line 8
end                                      % for idis1 at line 7
```

Table 12, step12.m, lists the program to perform ISO-DATA Step 12 and Step 13.

TABLE 12

Program STEP12.m

```
% ---------------------------------------------------------------
% ***** Step 12 & 13 (lump L or less clusters as allowed and updating
% *****            new cluster centers) ******
% ---------------------------------------------------------------
%
disp('***** Step 12 and 13 *****')
for idis1=1:nc-1
    for idis2=2:nc
        if (idis1 ~= idis2 & idis2 >= idis1 & lump(idis1,idis2) == 1)
            %
            z1_n=n_total(idis1)*z(idis1,1)+n_total(idis2)*z(idis2,1);
            z(idis1,1)=z1_n/(n_total(idis1)+n_total(idis2));
            %
            z2_n=n_total(idis1)*z(idis1,2)+n_total(idis2)*z(idis2,2);
            z(idis1,2)=z2_n/(n_total(idis1)+n_total(idis2));
            %
            z3_n=n_total(idis1)*z(idis1,3)+n_total(idis2)*z(idis2,3);
            z(idis1,3)=z3_n/(n_total(idis1)+n_total(idis2));
            %
            z4_n=n_total(idis1)*z(idis1,4)+n_total(idis2)*z(idis2,4);
            z(idis1,4)=z4_n/(n_total(idis1)+n_total(idis2));
            %
            z5_n=n_total(idis1)*z(idis1,5)+n_total(idis2)*z(idis2,5);
            z(idis1,5)=z5_n/(n_total(idis1)+n_total(idis2));
            %
            z6_n=n_total(idis1)*z(idis1,6)+n_total(idis2)*z(idis2,6);
            z(idis1,6)=z6_n/(n_total(idis1)+n_total(idis2));
            %
            disp(z(idis1,:))
            z(idis2,:)=99999;
        end                              % for if at line 9
    end                                  % for idis2 at line 8
end                                      % for idis1 at line 7
```

To illustrate the operation of the invention, a simple test case of an electronic warfare (EW) scenario consisting of five (5) radar threats was provided to a simulation of system 20. The five radar threats and their characteristics are listed in Table 13.

TABLE 13

Radar Threat Characteristics for ISODATA Simulation

| Threat | RF Freq | PRI | Pulse Width | Pulse Amplitude |
|---|---|---|---|---|
| 1 | 800–1,000 MHz | 1120 us | 7–9 us | 0 to −10 dBm |
| 2 | 1000–1100 MHz | 1820 us | 13–15 us | −10 to −20 dBm |
| 3 | 1075–1225 MHz | 1920 us | 3–5 us | −15 to −25 dBm |
| 4 | 1215–1405 MHz | 1320 us | 5.5–7.5 us | −30 to −40 dBm |
| 5 | 1207.5–1212.5 MHz | 2920 us | 11–13 us | −40 to −50 dBm |

Figure 3:
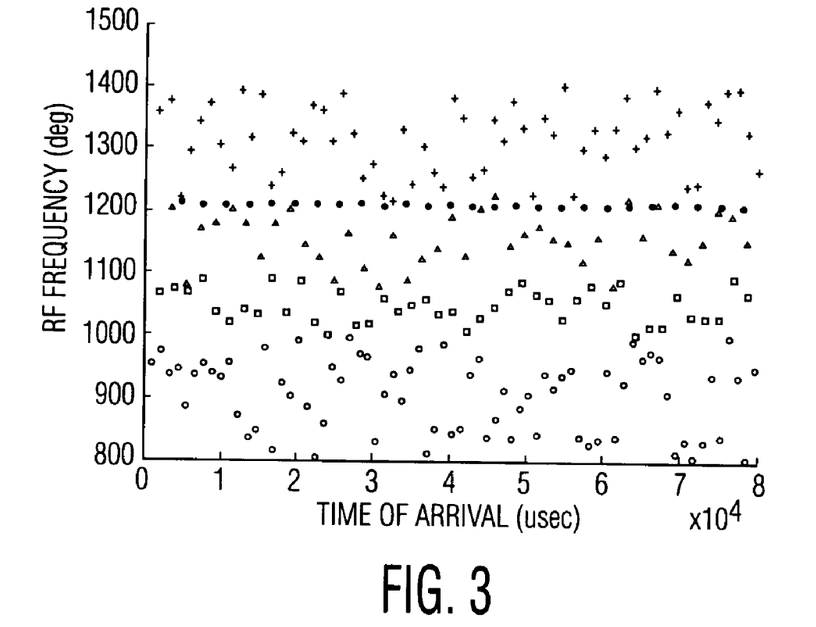
FIG. 3 is an example of an input snapshot showing radio frequency (RF) versus time of arrival, as received by a wideband receiver included in an embodiment of the present invention.
Figure 4:
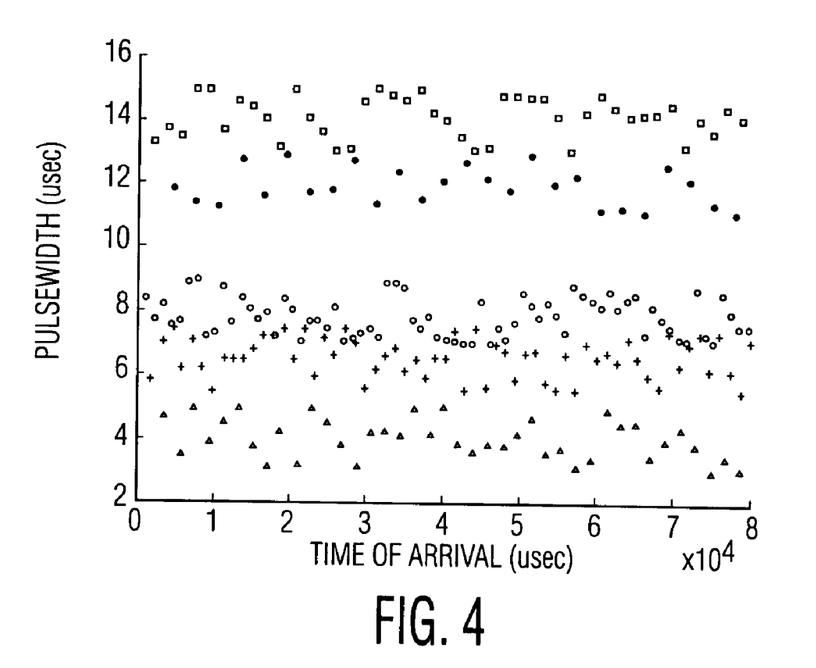
FIG. 4 is an example of another input snapshot showing pulse width versus time of arrival, as received by a wideband receiver included in an embodiment of the present invention.
Figure 5:
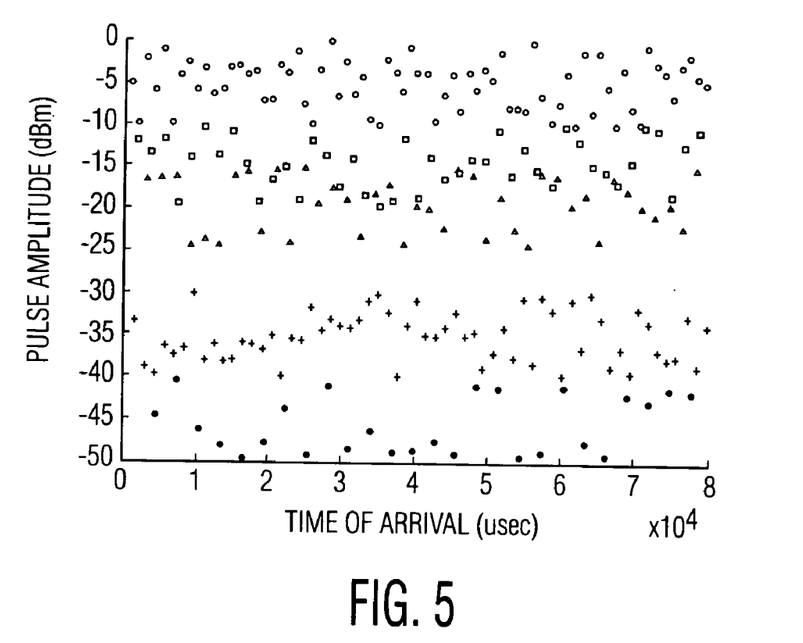
FIG. 5 is yet another example of an input snapshot showing pulse amplitude versus time of arrival, as received by a wideband receiver included in an embodiment of the present invention.
Figure 6:
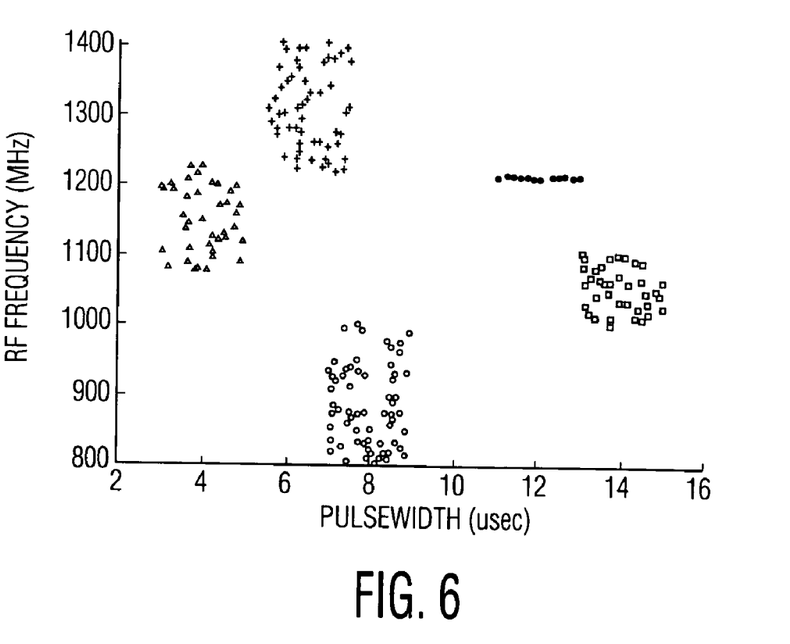
FIG. 6 is still another input snapshot showing RF frequency versus pulse width, as received by a wideband receiver included in an embodiment of the present invention.
Figure 7:
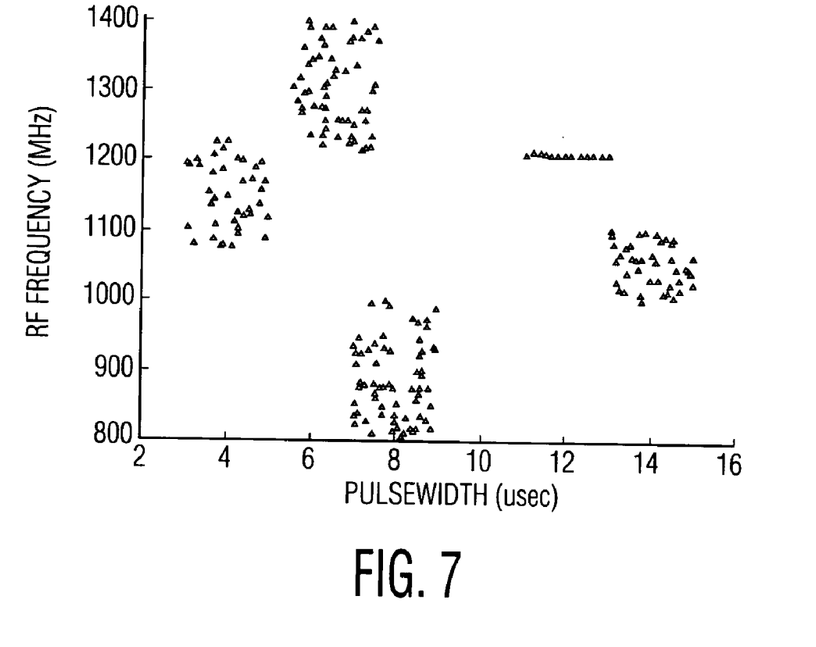
FIG. 7 is a plot of RF frequency versus pulse width resulting after one iteration of clustering, as performed in accordance with an embodiment of the present invention.

Snapshots of PDWs of this EW scenario were generated by the program threat generator listed in Table A. FIG. 3 illustrates a snapshot of the radars' RF frequency (RF) versus TOA. FIG. 4 illustrates a snapshot of the radars' pulse width (PW) versus TOA. FIG. 5 illustrates a snapshot of the radars' pulse amplitude (PA) versus TOA. These figures indicate that radar pulses from multiple threats are overlapped in RF, PW and PA. There, indeed, are five (5) radar threats in the input snapshots, when the snapshots are shown plotted as RF versus PW, as illustrated in FIG. 6.

Figure 8:
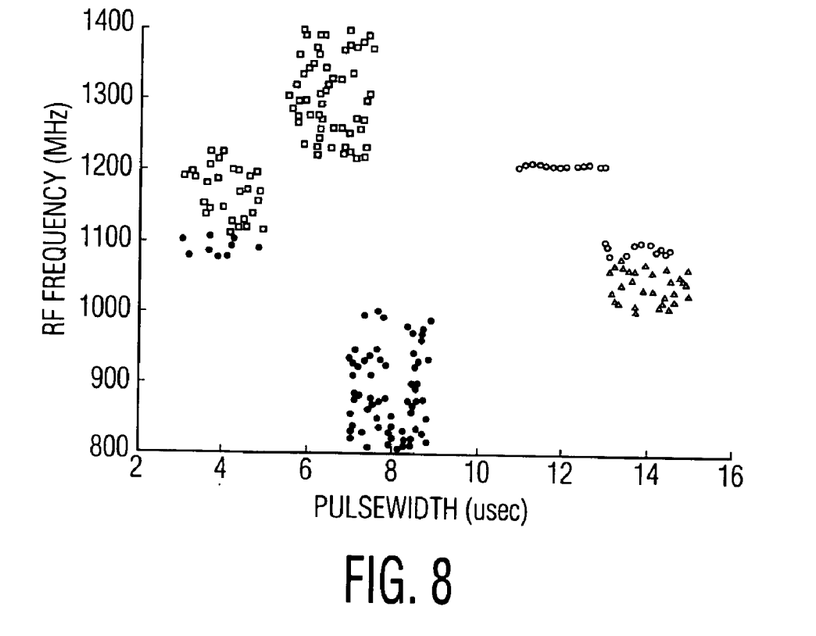
FIG. 8 is a plot of RF frequency versus pulse width resulting after four iterations of clustering, as performed by an embodiment of the present invention.
Figure 9:
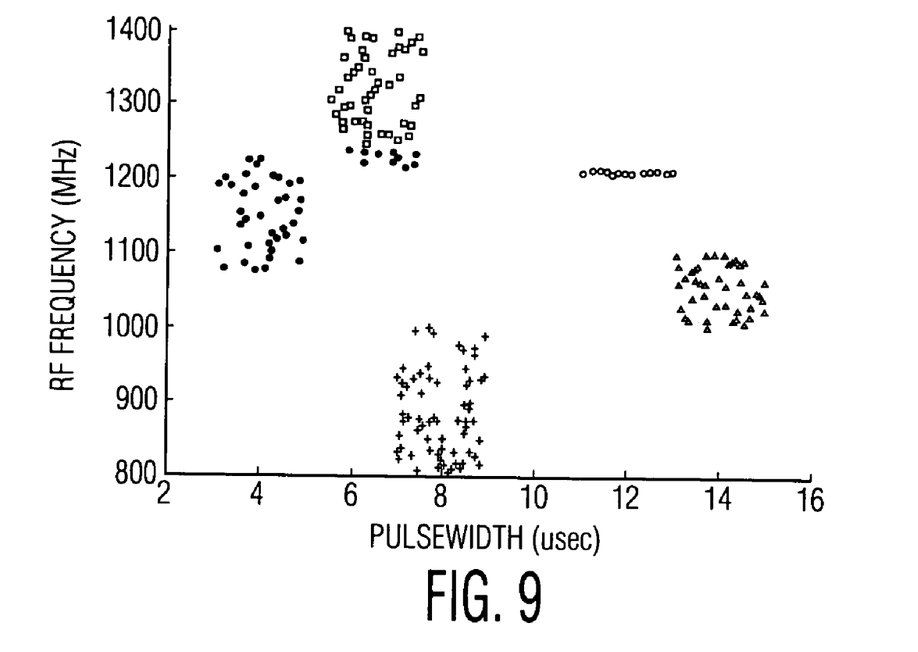
FIG. 9 is a plot of RF frequency versus pulse width resulting after six iterations of clustering, as performed by an embodiment of the present invention.
Figure 10:
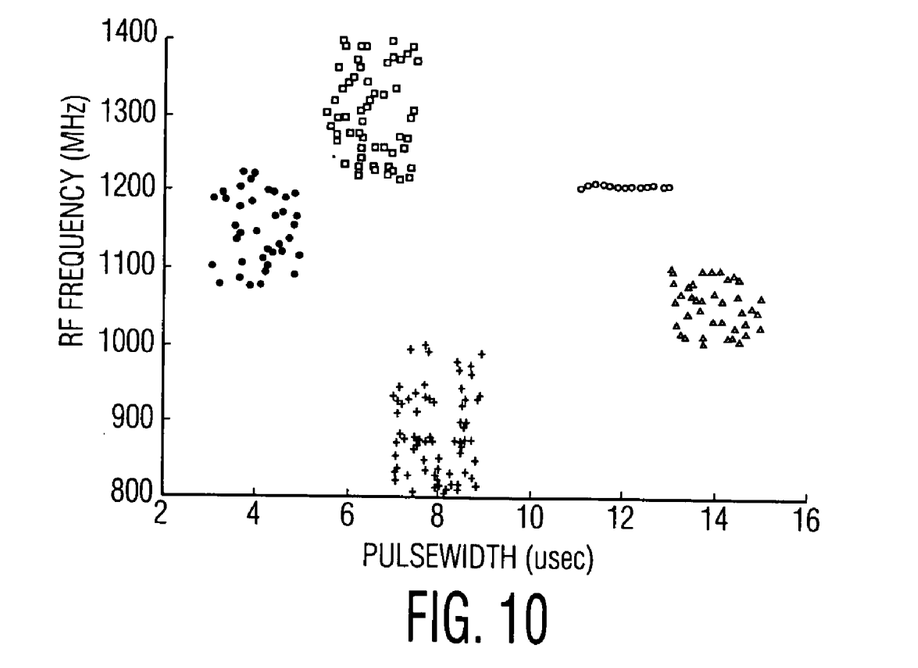
FIG. 10 is a plot of RF frequency versus pulse width resulting after seven iterations of clustering, as performed by an embodiment of the present invention.

Performance of system 20 in clustering and classifying the five radar threats is summarized in FIGS. 7–10. These figures illustrate the result and progress of clustering after 1, 4, 6 and 7 iterations, respectively. The system performs well after seven iterations, the system clusters the input snapshots into five radar threats, without errors, as shown in FIG. 8.

It will be appreciated that system 20 may be used to cluster EW scenarios consisting of mixes of stable radars and advanced radars, such as dwell switched and frequency agile radars.

It will also be appreciated that to cluster advanced emitters having frequency agility capability, the weighs ($w_1$, $w_2$, and others, if necessary) used in Euclidean distance calculations between PDWs may be made adaptive, so that PDWs from different threats may be sorted into different clusters and PDWs from the same threat will not be partitioned into multiple clusters. As an example, the weights may be made a function of the operational frequency band of the radar emitter and the size of clusters generated may be adjusted to prevent threat splitting.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of classifying radar emitters comprising the steps of:
   (a) receiving a plurality of signals from the radar emitters;
   (b) generating data components for each signal received from the radar emitters;
   (c) forming multi-dimensional samples using the generated data components; and
   (d) sorting the multi-dimensional samples into a plurality of data clusters, based on their respective proximity to the data clusters, each data cluster representing a classification of a radar emitter, wherein
   step (d) includes assigning a multi-dimensional sample to a data cluster, based on a Euclidean distance between the multi-dimensional sample and a center of the data cluster.

2. The method of claim 1 wherein
   step (b) includes generating pulse data descriptors (PDWs) during a predetermined interval of time.

3. The method of claim 2 wherein
generating the PDWs includes generating at least radio frequency (RF) data and pulse width (PW) data, during the predetermined interval of time for each received signal.

4. The method of claim 1 wherein
step (c) includes forming vectors, each vector comprised of a sum of weighted PDWs.

5. The method of claim 4 including
adaptively weighting each PDW, based on electronic warfare (EW) intelligence of signals expected to be received from the radar emitters.

6. The method of claim 4 including
normalizing each vector, based on an average vector of all the vectors formed in step (c) during a predetermined interval of time.

7. The method of claim 1 including
forming the center of the data cluster as a mean vector of a set of multi-dimensional samples assigned to the data cluster.

8. The method of claim 7 including
re-assigning a multi-dimensional sample from the data cluster to another data cluster, based on a sum of squared errors resulting from the set of multi-dimensional samples assigned to the data cluster.

9. The method of claim 1 wherein
step (d) includes sorting the multi-dimensional samples using an ISODATA (iterative self-organizing data analysis technique) computer algorithm.

10. A system for classifying radar emitters comprising:
a receiver for receiving a plurality of signals from the radar emitters, and
a processor coupled to the receiver for
(a) generating data components for each signal received from the radar emitters,
(b) forming multi-dimensional samples from the generated data components; and
(c) sorting the multi-dimensional samples into a plurality of data clusters, based on their respective proximity to the data clusters, each data cluster representing a classification of a radar emitter, wherein
the processor assigns a multi-dimensional sample to a data cluster, based on a Euclidean distance between the multi-dimensional sample and a center of the data cluster.

11. The system of claim 10 wherein
the data components are generated as pulse data descriptors (PDWs) during a predetermined interval of time, and
each PDW includes at least radio frequency (RF) data and pulse width (PW) data.

12. The system of claim 11 wherein
each PDW is adaptively weighted, based on electronic warfare (EW) intelligence of signals expected to be received from the radar emitters.

13. The system of claim 10 wherein
the center of the data cluster is formed as a mean vector of a set of multi-dimensional samples assigned to the data cluster.

14. The system of claim 10 wherein
the processor sorts the multi-dimensional samples using an ISODATA (iterative self-organizing data analysis technique) computer algorithm.

15. A machine readable storage medium containing a set of instructions for a computer, the set of instructions implementing the following steps:
(a) processing a plurality of signals received from a receiver;
(b) generating data components for each signal received from the receiver;
(c) forming multi-dimensional samples using the generated data components; and
(d) sorting the multi-dimensional samples into a plurality of data clusters, based on their respective proximity to the data clusters, each data cluster representing a classification of a radar emitter, wherein
step (d) includes assigning a multi-dimensional sample to a data cluster, based on a Euclidean distance between the multi-dimensional sample and a center of the data cluster.

16. The medium of claim 15 wherein
step (b) includes generating pulse data descriptors (PDWs) during a predetermined interval of time, and
each of the generated PDWs includes at least radio frequency (RF) data and pulse width (PW) data.

17. The medium of claim 15 wherein
step (d) includes sorting the multi-dimensional samples using an ISODATA (iterative self-organizing data analysis technique) computer algorithm.

18. A method of classifying radar emitters comprising the steps of:
(a) receiving a plurality of signals from the radar emitters;
(b) generating data components for each signal received from the radar emitters;
(c) forming multi-dimensional samples of multi-dimensional weighted vectors using the generated data components; and
(d) sorting the multi-dimensional samples into a plurality of data clusters, based on their respective geometric proximity to a center of a data cluster, each center representing a classification of a radar emitter.

19. The method of claim 18 wherein
step (b) includes generating pulse data descriptors (PDWs) during a predetermined interval of time.

20. The method of claim 19 wherein
generating the PDWs includes generating at least radio frequency (RF) data and pulse width (PW) data, during the predetermined interval of time for each received signal.

21. The method of claim 19 including
adaptively weighting each PDW, based on electronic warfare (EW) intelligence of signals expected to be received from the radar emitters.

* * * * *